(12) United States Patent
Kaneda

(10) Patent No.: US 11,714,587 B2
(45) Date of Patent: Aug. 1, 2023

(54) IMAGE FORMING APPARATUS USING PRINT SETTING VALUES AND CONTROLLING METHOD OF IMAGE FORMING APPARATUS

(71) Applicant: CANON KABUSHIKI KAISHA, Tokyo (JP)

(72) Inventor: Takeshi Kaneda, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/739,294

(22) Filed: May 9, 2022

(65) Prior Publication Data

US 2022/0269462 A1  Aug. 25, 2022

Related U.S. Application Data

(63) Continuation of application No. 16/925,604, filed on Jul. 10, 2020, now Pat. No. 11,354,077, which is a continuation of application No. PCT/JP2019/000537, filed on Jan. 10, 2019.

(30) Foreign Application Priority Data

Jan. 12, 2018 (JP) ................................. 2018-003774

(51) Int. Cl.
G06F 3/12 (2006.01)

(52) U.S. Cl.
CPC .......... *G06F 3/1257* (2013.01); *G06F 3/1204* (2013.01); *G06F 3/1222* (2013.01); *G06F 3/1238* (2013.01)

(58) Field of Classification Search
None
See application file for complete search history.

(56) References Cited

U.S. PATENT DOCUMENTS

| 10,504,014 B2 | 12/2019 | Kaneda |
| 2006/0082802 A1 | 4/2006 | Furuya |
| 2007/0124516 A1 | 5/2007 | Ohara et al. |
| 2009/0217268 A1 | 8/2009 | Pandit et al. |
| 2016/0295033 A1 | 10/2016 | Hirasawa |

(Continued)

FOREIGN PATENT DOCUMENTS

| JP | 2004-234510 A | 8/2004 |
| JP | 2005-43981 A | 2/2005 |

(Continued)

OTHER PUBLICATIONS

RFC2911 Section 3.2.3 Validate-Job Operation [searched as of Jan. 9, 2018] (https://tools.ietf.org/html/rfc2911).

(Continued)

*Primary Examiner* — Thomas D Lee
(74) *Attorney, Agent, or Firm* — Venable LLP

(57) ABSTRACT

An image forming apparatus includes a controller including a processor, with the controller configured to register a first print setting value related to a predetermined print setting item, and receive, from an information processing apparatus, a second print setting value set by the information processing apparatus, wherein the received second print setting value is related to the predetermined print setting item. The registered first print setting value is compared to the received second print setting value, and information based on a result of the comparison is transmitted to the information processing apparatus.

15 Claims, 9 Drawing Sheets

(56) References Cited

U.S. PATENT DOCUMENTS

| | | |
|---|---|---|
| 2017/0286030 A1 | 10/2017 | Matsui et al. |
| 2019/0303054 A1 | 10/2019 | Kaneda |
| 2020/0073603 A1 | 3/2020 | Kaneda et al. |
| 2020/0125301 A1 | 4/2020 | Kaneda |
| 2020/0319830 A1 | 10/2020 | Kaneda et al. |

FOREIGN PATENT DOCUMENTS

| | | |
|---|---|---|
| JP | 2006-110861 A | 4/2006 |
| JP | 2007-261172 A | 10/2007 |
| JP | 2011-118475 A | 6/2011 |
| JP | 2016-91044 A | 5/2016 |
| JP | 2017-84027 A | 5/2017 |

OTHER PUBLICATIONS

PWG 5100.13 Job and Printer Extensions 1.3 Constraints and "preferred-attributes" [searched as of Jan. 9, 2018] (https://ftp.pwg.org/pub/pwg/candidates/cs-ippjobprinterext3v10-20120727-5100.13.pdf).

International Search Report and Written Opinion issued in corresponding parent International Application No. PCT/JP2019-000537 dated Mar. 12, 2019.

International Preliminary Report on Patentability dated Jul. 23, 2020, in corresponding PCT Application No. PCT/JP2019/000537.

English translation of Japanese Application 2006-091083, corresponding to Japanese Application Publication 2007-261172 (Yar 2006).

Japanese Office Action dated Aug. 0, 2022, in related Japanese Patent Application No. 2018-003774.

FIG. 7

| USER NAME | FORCED SETTING | | |
|---|---|---|---|
| | TWO-SIDED | MONOCHROME | N in 1 |
| SATO | T | T | 2 |
| SUZUKI | T | F | 2 |
| GUEST | T | T | 2 |
| ADMIN | F | F | 1 |

● ABOUT TWO-SIDED AND MONOCHROME
  T : FORCED ON
  F : ARBITRARY (FOLLOW USER SETTING)

● N in 1
  1 : ARBITRARY
  2 : 2in1 SETTING REQUIRED

FIG. 8

●TWO-SIDED PRINTING RESTRICTION

8100

| TWO-SIDED SETTING | ITEMS TO BE PROHIBITION TARGET OF TWO-SIDED SETTING (SETTING ITEMS OTHER THAN TWO-SIDED SETTING) | | |
|---|---|---|---|
| | PAPER TYPE | | |
| | 8110 RESTRICTION LOOSENING SETTING ACCORDING TO PROHIBITION CONDITION | | 8120 RECOMMENDED SETTING AT TIME OF RESTRICTION, AND NON-PROHIBITION CONDITION |
| | OHP | THICK PAPER | 8121 OTHER |
| | [ALTERNATIVE SETTING] PAPER TYPE : OHP TWO-SIDED SETTING : OFF | [ALTERNATIVE SETTING] PAPER TYPE : THICK PAPER TWO-SIDED SETTING : OFF | [ALTERNATIVE SETTING] PAPER TYPE : NO CHANGE TWO-SIDED SETTING : ON |

8200

| TWO-SIDED SETTING | ITEMS TO BE PROHIBITION TARGET OF TWO-SIDED SETTING (SETTING ITEMS OTHER THAN TWO-SIDED SETTING) | | |
|---|---|---|---|
| | PAPER SIZE | | |
| | 8210 RESTRICTION LOOSENING SETTING ACCORDING TO PROHIBITION CONDITION | | 8220 RECOMMENDED SETTING AT TIME OF RESTRICTION, AND NON-PROHIBITION CONDITION |
| | B5 | B6 | 8221 OTHER |
| | [ALTERNATIVE SETTING] PAPER SIZE : B5 TWO-SIDED SETTING : OFF | [ALTERNATIVE SETTING] PAPER SIZE : B6 TWO-SIDED SETTING : OFF | [ALTERNATIVE SETTING] PAPER SIZE : NO CHANGE TWO-SIDED SETTING : ON |

●COLOR PRINTING RESTRICTION

8300

| FORCED MONOCHROME PRINTING | ITEMS TO BE PROHIBITION TARGET OF MONOCHROME PRINT SETTING |
|---|---|
| | NO CORRESPONDING ATTRIBUTE |
| | 8311 [ALTERNATIVE SETTING] COLOR/MONOCHROME SETTING: MONOCHROME PRINTING |

●2in1 RESTRICTION

8400

| FORCED 2up PRINTING | ITEMS TO BE PROHIBITION TARGET OF 2in1 PRINT SETTING | | |
|---|---|---|---|
| | PAPER SIZE | | |
| | 8410 RESTRICTION LOOSENING SETTING ACCORDING TO PROHIBITION CONDITION | | 8420 RECOMMENDED SETTING AT TIME OF RESTRICTION, AND NON-PROHIBITION CONDITION |
| | B5 | B6 | 8421 OTHER |
| | [ALTERNATIVE SETTING] PAPER SIZE : B5 Nup : 1in1 | [ALTERNATIVE SETTING] PAPER SIZE : B6 Nup : 1in1 | [ALTERNATIVE SETTING] PAPER SIZE : OTHER Nup : 2in1 | ns
IMAGE FORMING APPARATUS USING PRINT SETTING VALUES AND CONTROLLING METHOD OF IMAGE FORMING APPARATUS

This application is a continuation of application Ser. No. 16/925,604, filed Jul. 10, 2020.

CROSS-REFERENCE TO RELATED APPLICATIONS

This application is a Continuation of International Patent Application No. PCT/JP2019/000537, filed Jan. 10, 2019, which claims the benefit of Japanese Patent Application No. 2018-003774, filed Jan. 12, 2018, both of which are hereby incorporated by reference herein in their entirety.

BACKGROUND OF THE INVENTION

Field of the Invention

The present invention relates to an image forming apparatus that processes a job, and a controlling method of the image forming apparatus.

Description of the Related Art

There is a printing apparatus that is connected to a network and that receives print data from an information processing apparatus via the network and performs printing. Besides, it is conventionally known that, by using a printer driver (or a print application) designed for using individual printing apparatus, an information processing apparatus generates print data to be transmitted to the printing apparatus.

In recent years, it is known that an information processing apparatus generates print data without using a printer driver (or a print application) designed for using each printing apparatus. For example, print data is generated by a general-purpose print service provided as a function of an OS (operating system) of the information processing apparatus or a general-purpose print service provided by a print server on a cloud computing, and the generated print data is transmitted to the printing apparatus. Besides, for example, a network protocol (IPP: Internet Printing Protocol) for transmitting print data to the printing apparatus to cause to perform printing is implemented. The printing process is realized by communication between the printing apparatus and the information processing apparatus according to this protocol.

The print server or the information processing apparatus that provides the general-purpose print service based on a standard such as the IPP or the like is desired to correspond to various types of printing apparatuses. Under such a circumstance, since it is impossible to internally hold functions, specifications and prohibition conditions that are different for respective printing apparatuses, it is necessary to obtain these matters from the printing apparatus or to inquire the printing apparatus about these matters. Here, "RFC2911 Section 3.2.3 Validate-Job Operation [searched on Jan. 9, 2018] (https://tools.ietf.org/html/rfc2911)" describes a means for returning an unsupported attribute of a job attribute (without inputting the job) when issuing a validate job operation in IPP printing. Besides, "PWG 5100.13 Job and Printer Extensions 1.3 Constraints and 'preferred-attributes' [searched on Jan. 9, 2018] (https://ftp.pwg.org/pub/pwg/candidates/cs-ippjobprinterext3v10-20120727-5100.13.pdf)" describes a means for returning a recommended setting from a job input target to a job input source when a validate job of "RFC2911 Section 3.2.3 Validate-Job Operation [searched on Jan. 9, 2018] (https://tools.ietf.org/html/rfc2911)" is used. More specifically, it is described that information of job-preferred-attributes-supported is received as a return value of a validate job command. As a specific example, "PWG 5100.13 Job and Printer Extensions 1.3 Constraints and 'preferred-attributes' [searched on Jan. 9, 2018] (https://ftp.pwg.org/pub/pwg/candidates/cs-ippjobprinterext3v10-20120727-5100.13.pdf)" describes that, as the 'preferred-attributes', a conflict is resolved and an alternative setting value capable of being used is returned.

Although a printer driver corresponding to a general printing apparatus provides a plurality of setting items such as a paper type selection, an image quality setting, a finishing process selection and the like, there is a case where a plurality of functions cannot be used simultaneously depending on the setting for each function. This is usually called a "prohibition condition" in which combinations of the setting items that cannot be designated are fed back to a user. Besides, there is a case where the printing apparatus provides a "function restriction for each user" that restricts the functions available for each user. However, in setting value verification, in a case where a setting value corresponds to a function restriction or a prohibition condition, although notification related to the prohibition condition and/or the function restriction can be performed, it is difficult from a user viewpoint and/or an implementation viewpoint to propose an appropriate recommended setting value and/or an alternative setting value. Moreover, complexity of implementation of services that use the image forming apparatus increases.

SUMMARY OF THE INVENTION

The present invention has been completed in view of at least one of such problems as described above, and one aspect of the embodiments of the present invention is to suppress complexity of implementation of services that use an image forming apparatus. One aspect of the present invention is an image forming apparatus that is characterized by comprising: a receiving unit configured to receive a setting value of a job from an information processing apparatus; and a notifying unit configured to, in a case where a print setting received by the receiving unit corresponds to a prohibition condition and does not correspond to a prohibition condition based on print authority of a job issuing source, notify the information processing apparatus of a combination of setting values being a prohibition target and not notify the information processing apparatus of an alternative setting not corresponding to the prohibition condition.

Another aspect of the present invention is an image forming apparatus that is characterized by comprising: a receiving unit configured to receive a setting value of a job from a communicating apparatus; and a notifying unit configured to, in a case where the setting value received by the receiving unit includes a setting value corresponding to prohibition of print authority of a job issuing source and an alternative setting value capable of being an alternative of the setting value corresponding to the prohibition of the print authority of the job issuing source corresponds to a predetermined prohibition condition related to the setting value of the job, not notify a setting value capable of further being an alternative of the alternative setting value and notify information related to the predetermined prohibition condition.

Further features of the present invention will become apparent from the following description of exemplary embodiments with reference to the attached drawings.

BRIEF DESCRIPTION OF THE DRAWINGS

FIG. 7 is a diagram for describing an example of a user management table on an authentication server that restricts the functions of the printing apparatus for each user.

FIG. 8 is a diagram for describing an example of a recommended setting management table of a forced function of the printing apparatus.

DESCRIPTION OF THE EMBODIMENTS

Figure 1:
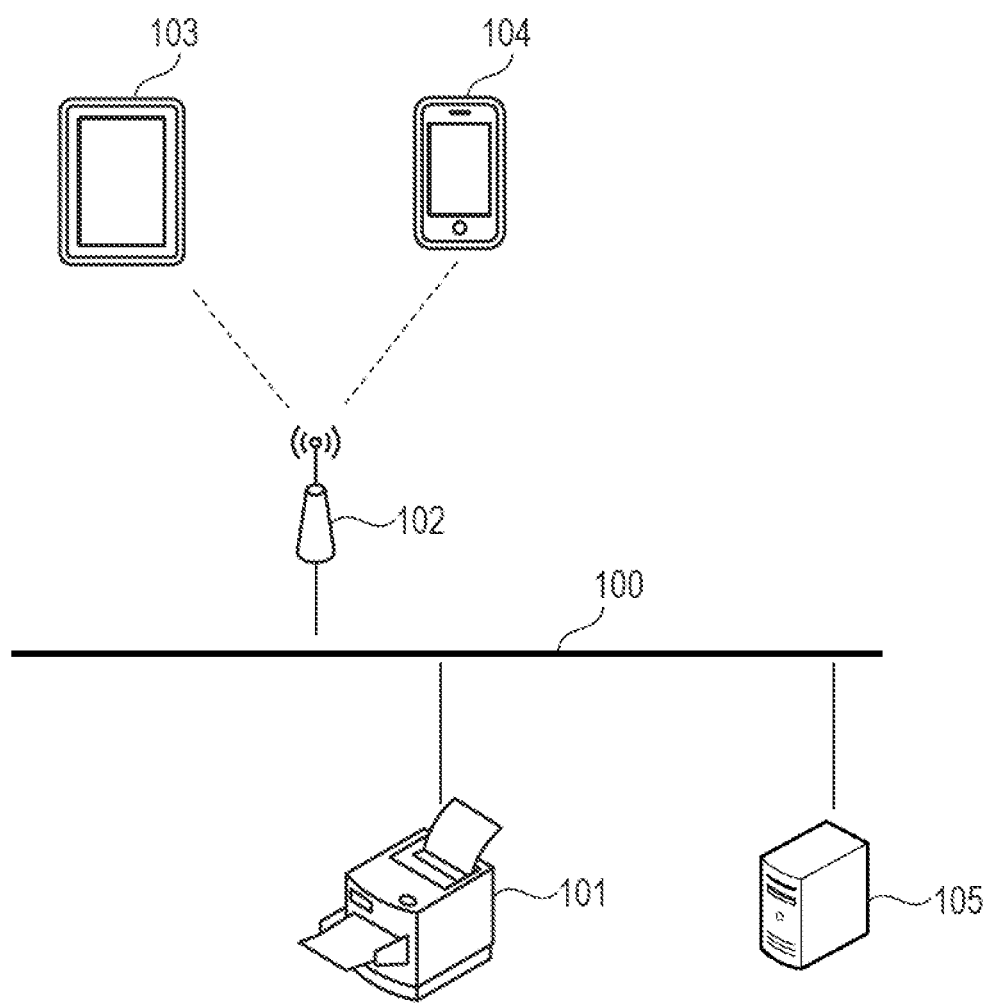
FIG. 1 is a diagram for describing an example of a configuration of a printing system of the present invention.

Hereinafter, preferred embodiments of the present invention will be described in detail with reference to the attached drawings. FIG. 1 is a diagram for describing an example of a configuration of a printing system that is an embodiment of the present invention. On a LAN (local area network) 100, a printing apparatus 101 and an AP (access point) 102 are communicably connected to each other. Here, as examples of an information processing apparatus that transmits a print job to the printing apparatus 101, mobile terminals 103 and 104 such as tablets, smartphones or the like will be described.

Hereinafter, the mobile terminal 103 will be described as a representative. The mobile terminal 103 can mutually communicate with the printing apparatus 101 on the LAN 100 via the AP 102. When the printing apparatus 101 processes the print job, a management server 105 of print setting manages information related to a print function that can be set by a user of each of the mobile terminals 103 and 104. When a print job request is received from the mobile terminal 103, the printing apparatus 101 inquires the management server 105 about whether printing is possible for each user, and performs a printing process based on a result of the inquiry. The printing apparatus 101 is an example of an image forming apparatus, the print job is an example of a job, and the user is an example of a job issuing source. The job issuing source may be a department corresponding to a department ID. Incidentally, the job issuing source may be referred to as a job creator.

In the present embodiment, the above configuration example is described as an example of the printing system. However, the present invention is not limited to this example, and at least one or more information processing apparatuses and printing apparatuses may communicably be connected to others via a network. Besides, the network may be wireless or wired. Besides, the management server of the print setting does not have to be separated from the printing apparatus 101, and may have a form in which a user DB (database) server is held inside the printing apparatus. Initially, the printing apparatus 101 will be described. The printing apparatus 101 has a printing function of printing an image on a sheet (recording medium). The printing apparatus 101 can perform the printing process based on print data received via the network.

Figure 2:
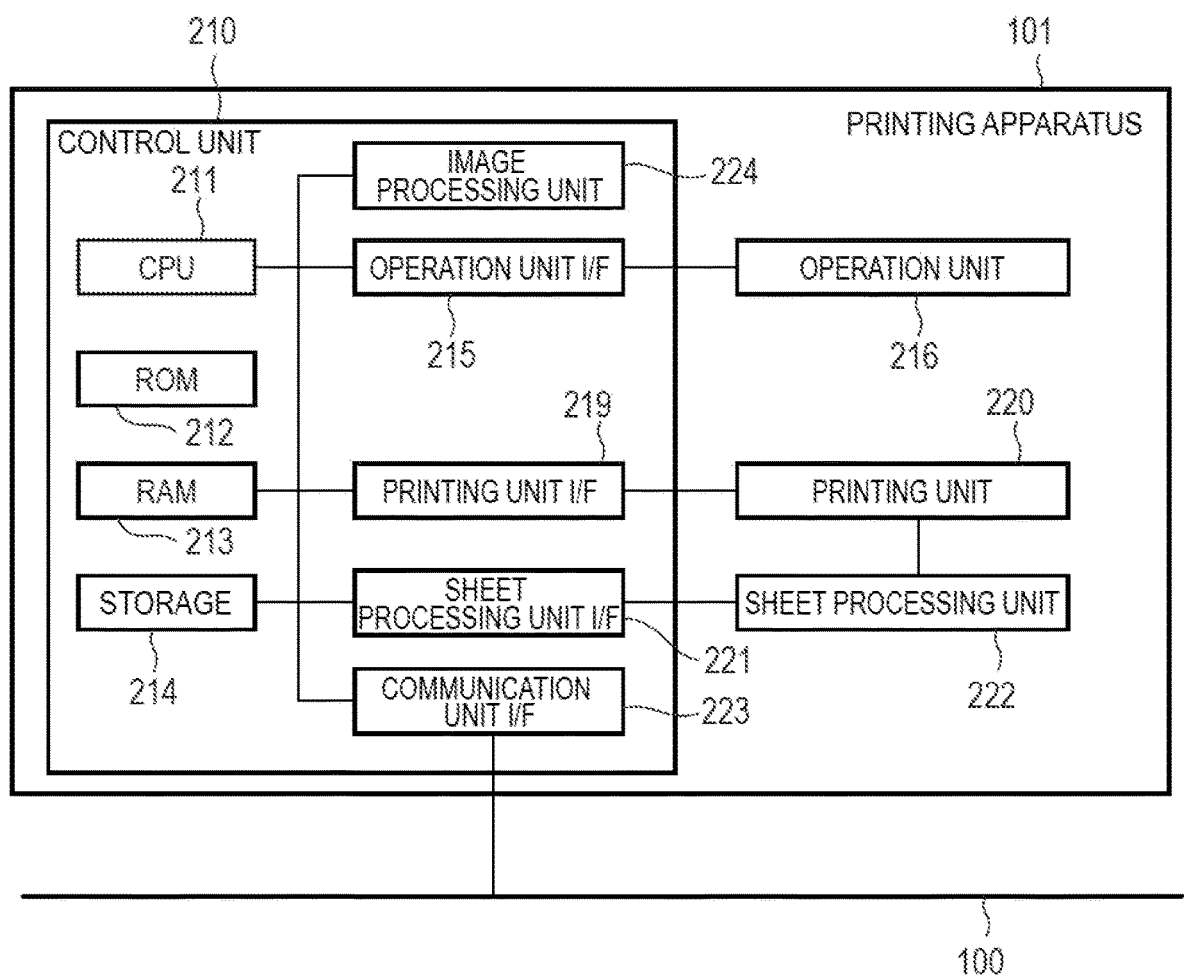
FIG. 2 is a block diagram for describing an example of a hardware constitution of a printing apparatus.

FIG. 2 is a diagram for describing an example of a hardware constitution of the printing apparatus 101 according to the present embodiment. The printing apparatus 101 has the printing function of printing the image on the sheet. In the present embodiment, the printing apparatus is described as an example. Here, the printing apparatus may be a printing apparatus such as an MFP (multi-function peripheral) including a scanner and a facsimile function.

A control unit 210 including a CPU (central processing unit) 211 controls the operation of the entire MFP (printing apparatus) 101. The CPU 211 expands programs stored in a ROM (read only memory) 212 or a storage 214 into a RAM (random access memory) 213 and executes the expanded programs to perform various kinds of control such as printing control, reading control and the like. The ROM 212 stores therein control programs, boot programs and the like that can be executed by the CPU 211. The RAM 213 is a main storage memory for the CPU 211, and is used as a work area or a temporary storage area for developing various control programs. The storage 214 stores therein print data, image data, various programs, and various kinds of setting information. In the present embodiment, an auxiliary storage device such as an HDD (hard disk drive) or the like is assumed as the storage 214. However, a non-volatile memory such as SSD (solid state drive) or the like may be used.

Incidentally, in the printing apparatus 101 according to the first embodiment, one CPU 211 uses one memory (RAM 213) to perform respective processes in a later-described flowchart, but other modes are also possible. For example, a plurality of CPUs, RAMs, ROMs and storages may be made to cooperate with others to perform the respective processes shown in the later-described flowchart. Besides, a part of the processes may be performed by using a hardware circuit such as an ASIC (application specific integrated circuit) or an FPGA (field-programmable gate array).

An operation unit I/F (interface) 215 connects an operation unit 216 and the control unit 210 to each other. The operation unit 216 includes a displaying unit having a touch panel function, various hard keys, and the like, and functions as a displaying unit for displaying information and an accepting unit for accepting a user instruction. A printing unit I/F 219 connects a printing unit (printer engine) 220 and the control unit 210 to each other. The image data generated by analyzing the print job received from the mobile terminal 103 is transferred from the control unit 210 to the printing unit 220 via the printing unit I/F 219. The printing unit 220 receives a control command and the print job to be printed via the control unit 210, and prints an image on a sheet fed from a paper feed cassette (not illustrated) based on the received print job. Incidentally, a printing method of the printing unit 220 may be an electrophotographic printing method or an inkjet printing method. Besides, other printing methods such as a thermal transfer method and the like can also be applied. The control unit 210 is connected to the LAN 100 via a communication unit I/F 223. The communication unit I/F 223 transmits image data and information to the mobile terminal 103 on the LAN 100, and receives the print job and information from the mobile terminal 103 on the LAN 100.

An image processing unit 224 has a RIP (raster image processor) function of expanding the print job received via the LAN 100 and generating image data to be used for printing. Also, the image processing unit 224 can perform resolution converting process and correcting process of the image data obtained by expanding the print job. Incidentally, in the present embodiment, it is assumed that the image processing unit 224 is realized by the hardware circuit (the ASIC, the FPGA, or the like), but the present invention is not limited to this. For example, the MFP (printing apparatus) 101 may further include a processor for image processing applications, and the processor may execute an image processing program to realize an image process and a print data expanding process. In this case, the relevant processor and the CPU 211 cooperate with each other to realize the respective processes shown in the later-described flowchart. Further, the CPU 211 may execute a program for performing the image process to perform the image process and the print data expanding process. Furthermore, the image process may be performed by any combination thereof.

A sheet processing unit I/F 221 connects the control unit 210 and a sheet processing unit 222 to each other. The sheet processing unit 222 receives a control command from the control unit 210, and performs a post-process to sheets subjected to printing by the printing unit 220 according to the received control command.

Figure 3:
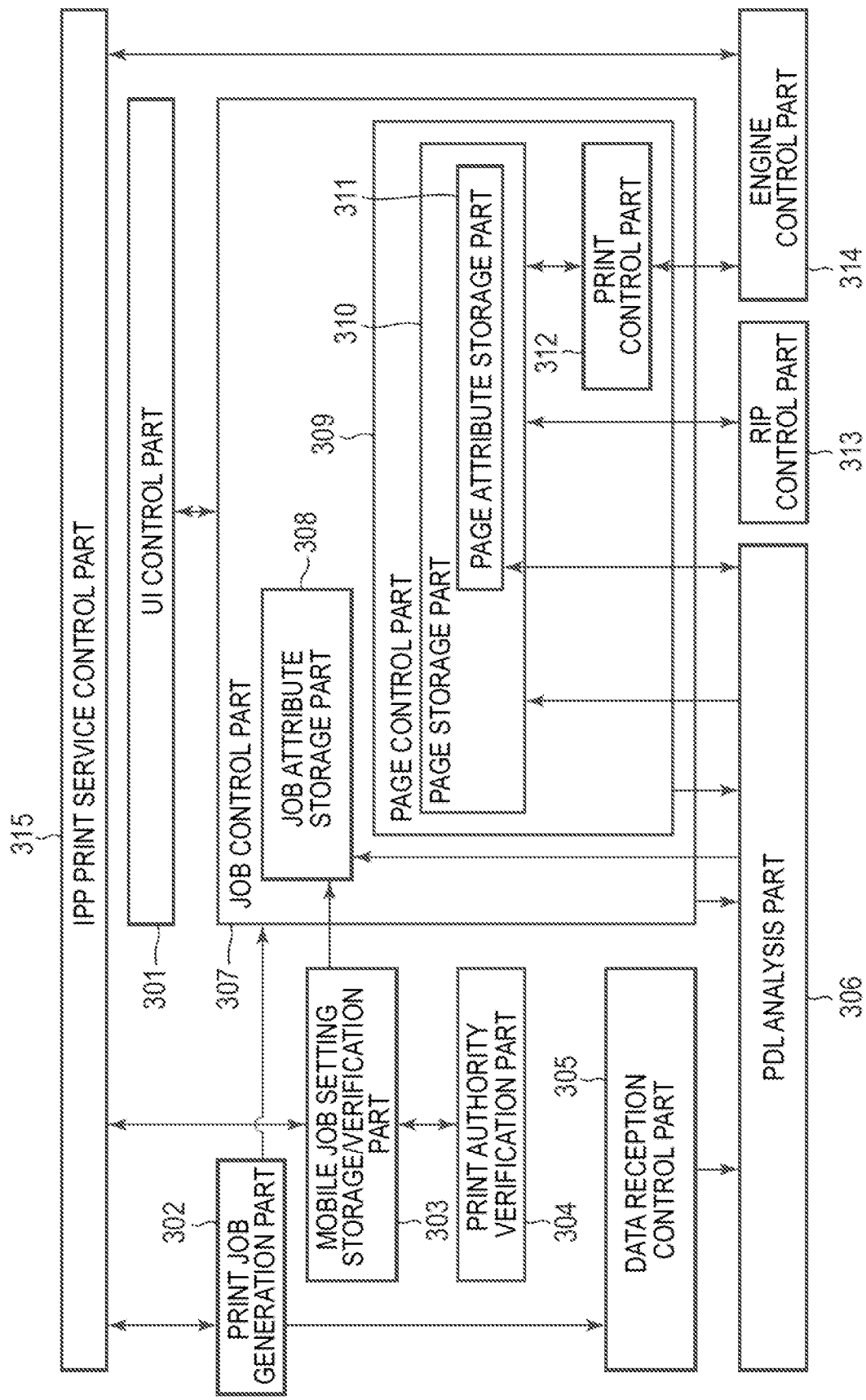
FIG. 3 is a functional block diagram for describing an example of a software configuration of the printing apparatus.

FIG. 3 is a functional block diagram for describing a software configuration of the MFP (printing apparatus) 101 according to the first embodiment. Incidentally, in the present embodiment, each functional block illustrated in FIG. 3 is achieved by the CPU 211 executing the program expanded into the RAM 213.

An IPP print service control part 315 notifies the portable terminal 103 of printer configuration information obtained from an engine control part 314. The configuration information includes detailed specifications to be displayed on a normal print setting screen, such as available paper sizes, available paper types, color and monochrome print modes, one-sided/two-sided printing, settings related to print imposition such as Nup, and the like.

The mobile terminal 103 creates a print screen based on the configuration information received from the printing apparatus 101. The user performs a print setting in the print screen created based on the configuration information, and presses a print button. When the print button is pressed, the mobile terminal 103 generates job setting information and requests the printing apparatus 101 to verify the user setting ("Validate-Job-Request" described later).

Upon receiving such a verification request, the IPP print service control part 315 passes print setting information to a mobile job setting storage/verification part 303. The mobile job setting storage/verification part 303 obtains print function restriction information for each user from the management server 105 via a print authority verification part 304. Then, in light of a job attribute set by each user, a print function permitted to be used, and a prohibition condition determined by a capability of a printer, when a result of the verification indicates that printing is possible, "printable" is notified to the mobile terminal 103 via the IPP print service control part 315. Here, if the user has set a print function unpermitted to be used, a recommended setting is notified so as not to use a prohibited function. Besides, in a case where print settings that cannot be combined as the capability of the printing apparatus 101 are set, the user is requested to review the print settings. Details of these processes will be described later with reference to a flowchart of FIG. 6 related to confirmation of prohibited conditions and notification of recommended settings.

An IPP client control unit of the mobile terminal 103 generates the print job and transmits the generated print job to the printing apparatus 101 only when the notification of "printable" as the result of the verification is received from the printing apparatus 101. When the verification result is "nonprintable", only "recommended setting" or both "recommended setting" and "prohibition notification" are received from the printing apparatus 101. When "recommended setting" is notified from the printing apparatus 101, an IPP client of the mobile terminal 103 overwrites the print setting item included in "recommended setting" with "recommended value" and displays a confirmation screen to the user. The IPP client of the mobile terminal 103 transmits the print data with a new print setting only when the user approves an updated setting value.

When an error notification indicating that the setting item corresponds to the prohibition condition is received from the printing apparatus 101, the IPP client of the mobile terminal 103 notifies the user that the setting item corresponds to the prohibition condition and urges the user to change the corresponding setting item. Then, when the user changes the print setting and presses the print button anew, the IPP client control unit of the mobile terminal 103 requests the printing apparatus 101 to re-verify the print setting.

Upon receiving an IPP print job from the mobile terminal 103, the IPP print service control part 315 passes the received data to a print job generation part 302, and also passes print job setting information to the mobile job setting storage/verification part 303.

A UI (user interface) control part 301 obtains information related to a state of the print job being processed from a job control part 307, and displays a processing status of the print job on a UI screen.

The print job generation part 302 receives the print job from the mobile terminal 103 via the IPP print service control part 315, writes drawing data in a data reception control part 305, registers the received print job in the job control part 307 as a new job, and requests a start of the printing process. Further, the print setting information to be applied to the print job is passed to a job attribute storage part 308 via the mobile job setting storage/verification part 303.

The data reception control part 305 is a reception buffer area for the print job received by the print job generation part 302, and temporarily stores the print job in the storage 214 for each print job. When the job control part 307 instructs a PDL (page-description language) analysis part 306 to perform a PDL analyzing process of the print job, the PDL analysis part 306 requests the data reception control part 305 for the relevant print job. Thus, the data reception control part 305 passes the data of the relevant print job to the PDL analysis part 306.

The job control part 307 instructs the PDL analysis part 306 to analyze the print job. With respect to page data generated by the PDL analysis part 306, a page control part 309 stores image data in a page storage part 310 and stores page attribute information in a page attribute storage part 311.

The job attribute storage part 308 stores attribute information of the print job. The relevant attribute information is set as an IPP job attribute such as "number of prints", "Nup (collective printing)", "printing surface (one-sided/two-sided) setting", "color/monochrome mode", "finishing setting" and the like, and a document attribute.

The page control part 309 controls a page analyzing process of the PDL analysis part 306, a RIP process of a RIP control part 313, and a print controlling process of a print control part 312. The print control part 312 obtains RIP-processed image data from the page storage part 310, performs color separation into CMYK image data, and transfers the obtained data to the engine control part 314. The engine control part 314 receives the CMYK-specific image data from the print control part 312 in page units, and controls the printing unit 220 to perform the printing process for each page.

Figure 4:
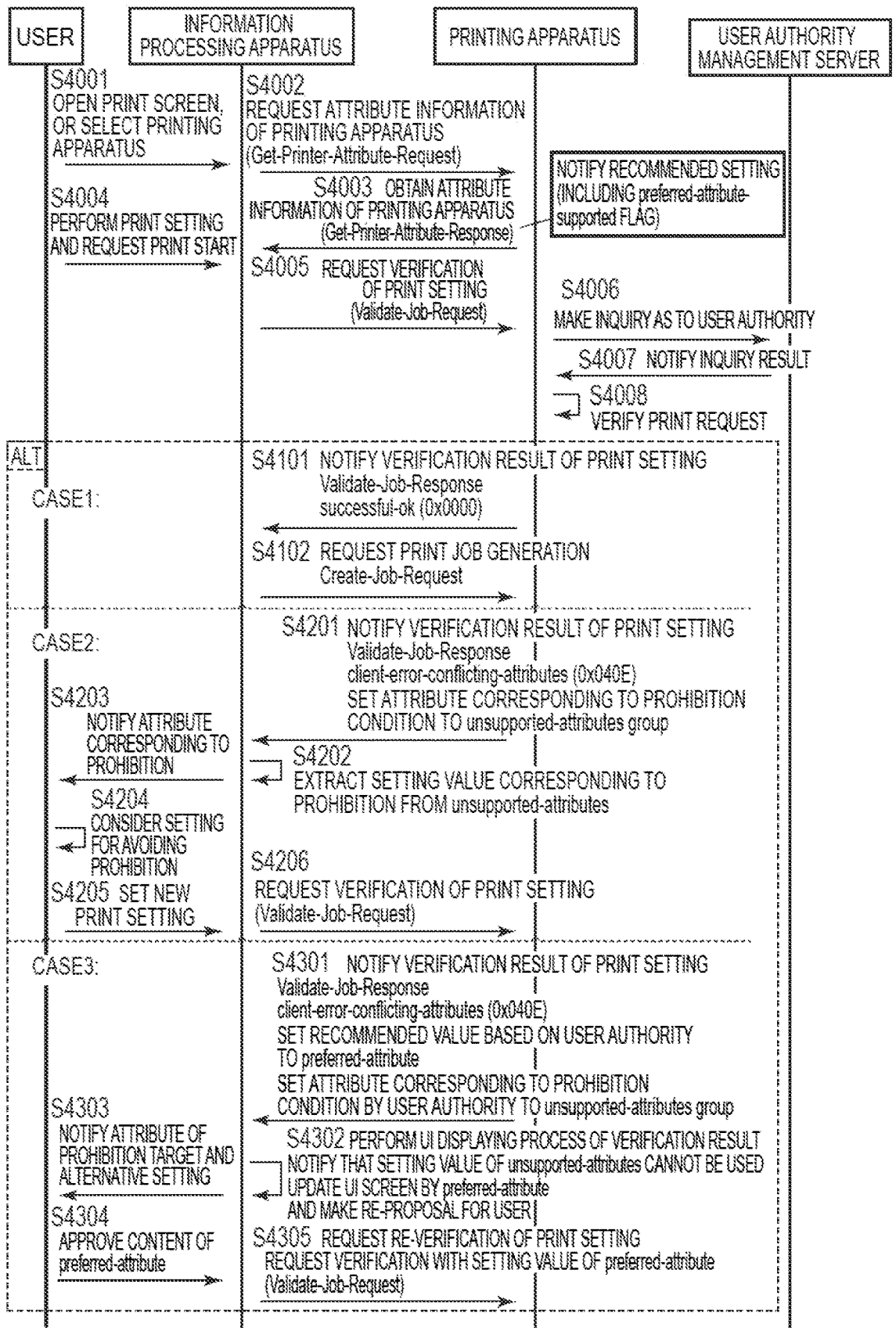
FIG. 4 is a diagram for describing an example of a sequence from a mobile terminal 103 to the printing apparatus.

FIG. 4 is a sequence diagram for describing the entire process such as verification of the print setting when printing from the mobile terminal 103 to the printing apparatus 101, resetting according to a verification result and the like in the printing system of the present embodiment.

In S4001, applications in the mobile terminals 103 and 104 accept an instruction to open the print screen in a print application in the mobile terminal 103 of the user. At this time, a search request for printer search is transmitted to the printing apparatus 101 on the same network 100, and the responding printer is listed on the printer of the display of the mobile terminal 103.

An example of the information processing apparatus is each of the mobile terminals 103 and 104.

In response to this, in S4002, the mobile terminal 103 accepts an instruction to select one specific printer from the user. The print screen is opened in response to the printer selection instruction. After the user selected the printer, the IPP client, that is the program in the mobile terminal 103, issues a request (Get-Printer-Attribute-Request) for attribute information of the printing apparatus to the printing apparatus 101 selected by the user. In S4003, the printing apparatus 101 responds to the mobile terminal 103 with capability information (Get-Printer-Attribute-Response) of the printing apparatus. At this time, the capability information notified in S4003 includes preferred-attribute-supported information for determining whether or not the printer can issue the recommended setting notification in regard to the print setting because the relevant print setting corresponds to the prohibition condition.

The mobile terminal 103 generates the print setting screen of the printing apparatus 101 based on the print capability information notified in S4003. In S4004, the user performs print setting on this print screen and presses the print button. In S4005, the mobile terminal 103 generates only the print setting (not including print data) from the print screen before generating and transmitting a print job, and requests the printing apparatus 101 to verify the print setting (Validate-Job-Request). Such a verifying process may be performed each time the user changes one item on the print setting screen, or may be collectively performed at timing when the print button is pressed after completing a series of setting changes. In S4006, the printing apparatus 101 inquires of the management server 105 of user authority as to user information of the mobile terminal 103 that has requested verification. Here, an inquiry is to transmit an inquiry request. In S4007, the management server notifies the printing apparatus 101 of setting items (indispensable setting items in the specification) that need to be set by the user and their setting values. In S4008, the printing apparatus 101 verifies whether or not the print setting requested in S4005 can be performed based on the print function that can be used by the user, the print setting, and the prohibition information of the printer.

As a result of the verification in S4008, a sequence in a case where the user's setting value is printable is shown in S4101 to S4102. In S4101, the printing apparatus 101 notifies the mobile terminal 103 of "printable" in response to the verification request in S4008. Upon receiving the notification in S4101, the mobile terminal 103 transmits print data to the printing apparatus 101 in S4102. In this case, any user operation does not occur in the printing process from S4004. This corresponds to CASE 1 of FIG. 4, and a process flow of S602, S610, S608 in the flowchart of later-described FIG. 6.

As a result of the verification in S4008, a sequence in a case where the user's setting value corresponds to the prohibition condition of the printing apparatus 101 and a notification of the setting item of the prohibition target and user's resetting of the target item are required is shown in S4201 to S4206.

In S4201, to the portable terminal 103, the printing apparatus 101 notifies that printing cannot be performed due to the prohibition condition and further notifies setting items corresponding to the prohibition condition and setting values thereof. In S4202, the mobile terminal 103 extracts information of the attribute corresponding to the prohibition condition in light of a response result. Then, in S4203, the prohibition information is notified to the user (9401, 9402 of FIG. 9). Here, to notify the prohibition information to the user is to, for example, display the prohibition information a display of the mobile terminal 103, or remotely notify the prohibition information by an e-mail or a Web service via a network. In S4204, the user changes the print setting for avoiding the prohibition condition of the printing apparatus 101 based on the display information on the mobile terminal 103. The mobile terminal 103 accepts the change of the print setting. Then, in S4205, the mobile terminal 103 accepts the press of the print button (9103 of FIG. 9) by the user. In response to this, the mobile terminal 103 issues anew a print setting verification request to the printing apparatus 101 in S4206. This corresponds to CASE 2 of FIG. 4, and a process flow of S602, S610, S611 in the flowchart of later-described FIG. 6.

As a result of the verification in S4008, a sequence of notification of the recommended setting based on the restriction item and user approval in a case where the setting value of the user corresponds to the function restriction for each user is shown in S4301 to S4305. In S4301, the printing apparatus 101 notifies that printing cannot be performed due to prohibition condition, notifies setting items corresponding to the prohibition condition and setting values thereof, and further notifies an attribute to be changed and an attribute value thereof as the recommended setting (S606 of FIG. 6). The meaning of the notification to the user is the same as that in S4203. Hereinafter, "the notification of the information processing apparatus to the user" is the same unless otherwise stated.

Figure 9:
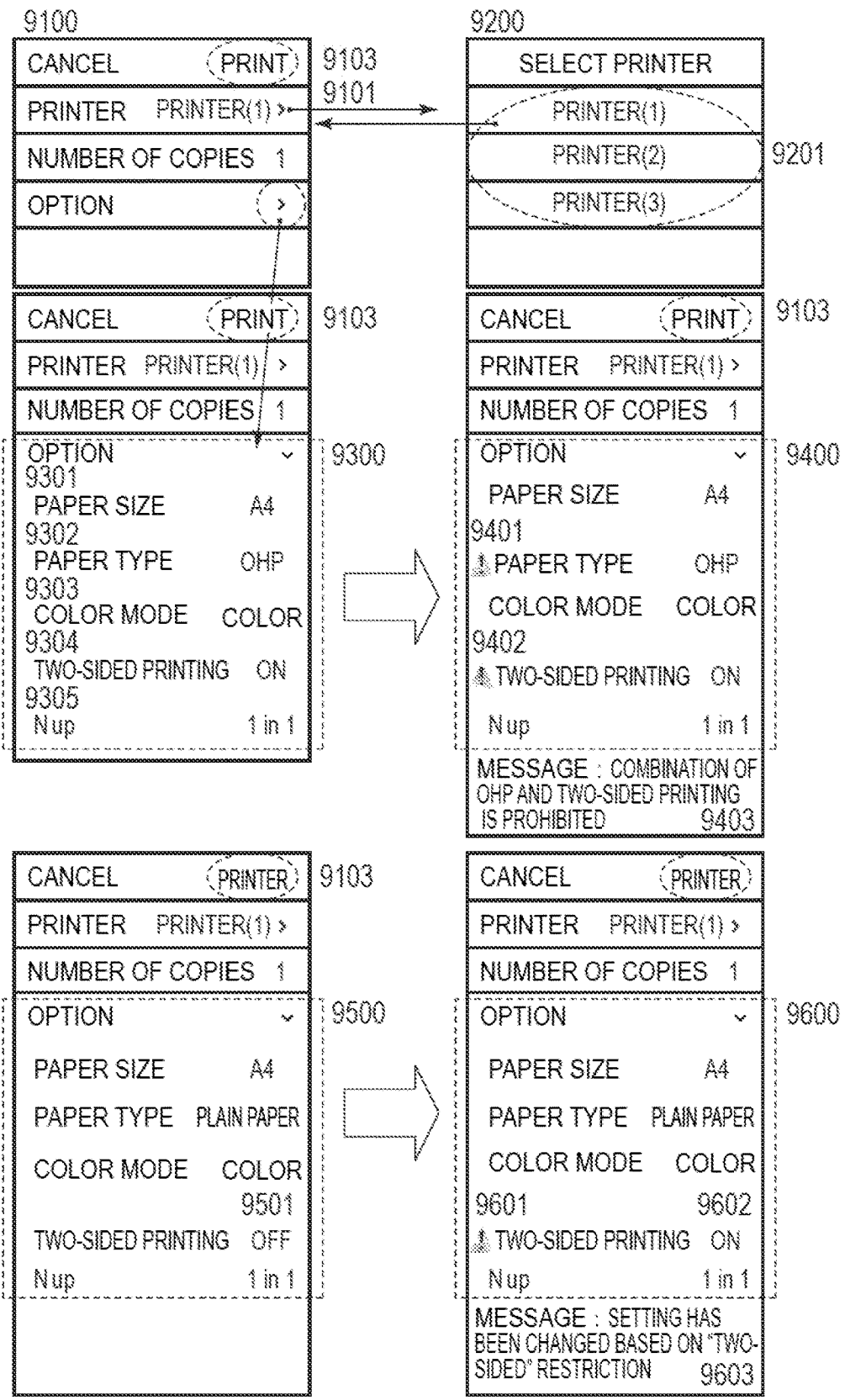
FIG. 9 is a diagram for describing an example of a print setting screen of the mobile terminal.

In light of this, in S4302, the mobile terminal 103 generates the print screen in which the setting item is changed according to the recommended setting value notified by the printing apparatus 101 (9601, 9602, 9603 of FIG. 9). By checking this screen, the user confirms that the setting item corresponding to the prohibition condition needs to be changed (S4303). The user confirms the changed print screen (9600 of FIG. 9) and presses the print button (9103 of FIG. 9) again to approve the recommended setting (S4304). Thus, the user gives priority to later setting, or performs the setting again. For example, the user gives priority to a first setting and gives up a second setting. Upon receiving the approval of the recommended setting, the mobile terminal 103 issues anew a print setting verification request to the printing apparatus 101. This corresponds to CASE 3 of FIG. 4, and a process flow of S601, S602, S603, S605, S606, S607 in the flowchart of later-described FIG. 6.

Figure 5:
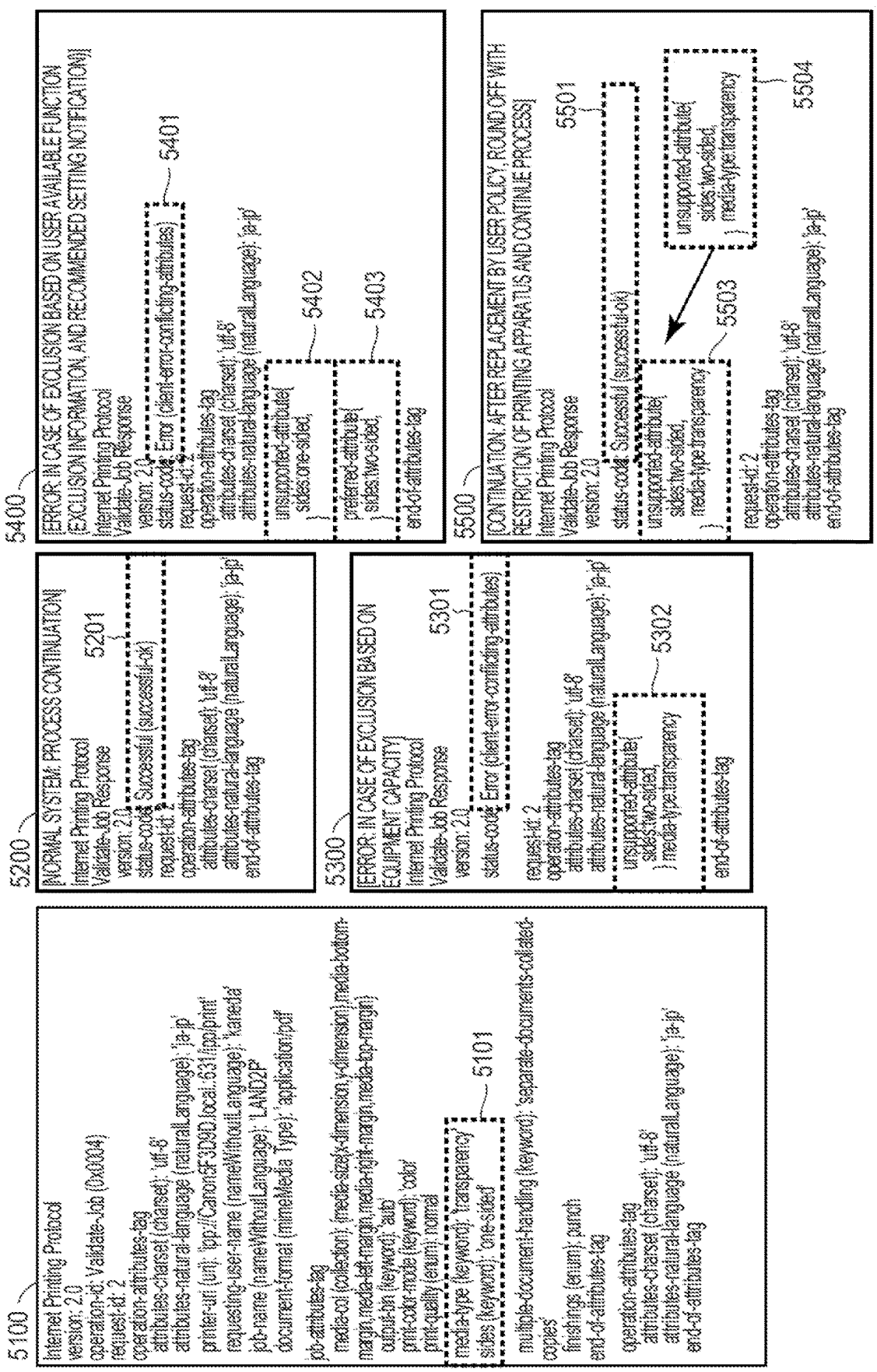
FIG. 5 is a diagram for describing an example of a verification request/response of an IPP print setting exchanged between the mobile terminal 103 and the printing apparatus.

FIG. 5 is a diagram for describing a message sample of print setting verification (Validate-Job).

A setting verification request message 5100 is an example of a message (S4005) in which the mobile terminal 103 requests the printing apparatus 101 to verify the print setting. The mobile terminal 103 notifies the printing apparatus 101 of verification results (S4101, S4201, S4301). Besides, messages S200, S300, S400 and 5500 are examples of responses in the respective notifications.

In the example of the setting verification request message 5100, the user makes a verification request related to print setting (5101) of an OHP (overhead projector) sheet as the paper type and of one-sided printing. Normally, when printing is possible, the printing apparatus 101 notifies the portable terminal 103 of "printing possible" (5201) shown in the message 5200. With this, the printing apparatus 101 issues a print job (CASE 1 of FIG. 4).

For example, when the user performs the setting verification in regard to the setting of the OHP sheet as the paper type and of two-sided printing, the following is given. Namely, the mobile terminal 103 accepts a setting verification instruction. Then, since the print setting corresponds to the prohibition condition of the printing apparatus 101 and the printing process cannot be performed, the user is notified that the print setting corresponds to a prohibition restriction. The message 5300 notifies that the user setting corresponds to the prohibition restriction of the printer. Incidentally, (client-error-conflicting-attributes) of a message 5301 indicates the following. Namely, the mobile terminal 103 notifies the user that the print setting of the mobile terminal 103 includes a setting combination corresponding to the prohibition condition, and that the concrete prohibitions in S302 are "two-sided printing" and "paper type: OHP" (CASE 2 of FIG. 4).

The message 5400 is the example of the error notification to be returned by the printing apparatus 101 to the mobile terminal 103 in a case where the verification request for the job setting including the restriction target function is received in a state that the function usable for each user is restricted by the management information of the management server 105. A status code indicates a prohibition error as indicated by a message 5401. However, unlike the message 5300, a prohibition target attribute associated with the function restriction for each user is described as an unsupported attribute in a message 5402, and the recommended setting value within the function restriction for each user is described in a message 5403. Based on the information of the message 5402, the mobile terminal 103 replaces the attribute that needs to be changed with the recommended value of the message 5403 and displays the changed attribute, and requests the user for approval (CASE 3 of FIG. 4).

Finally, an exception pattern in the print setting verification related to the function restriction for each user will be described. In the setting verifying process, since the print setting of the user is out of the function restriction for each user, a recommended setting value to which the forcedly setting item for each user is applied is generated. However, when the recommended value generated by applying the forced setting item corresponds to the prohibition condition of the printing apparatus 101, the forced application value is returned and printing is performed with the original setting (5501, 5503, 5504). This corresponds to an operation flow of S605, S609, S610, S608 in the flowchart of FIG. 6.

Figure 6:
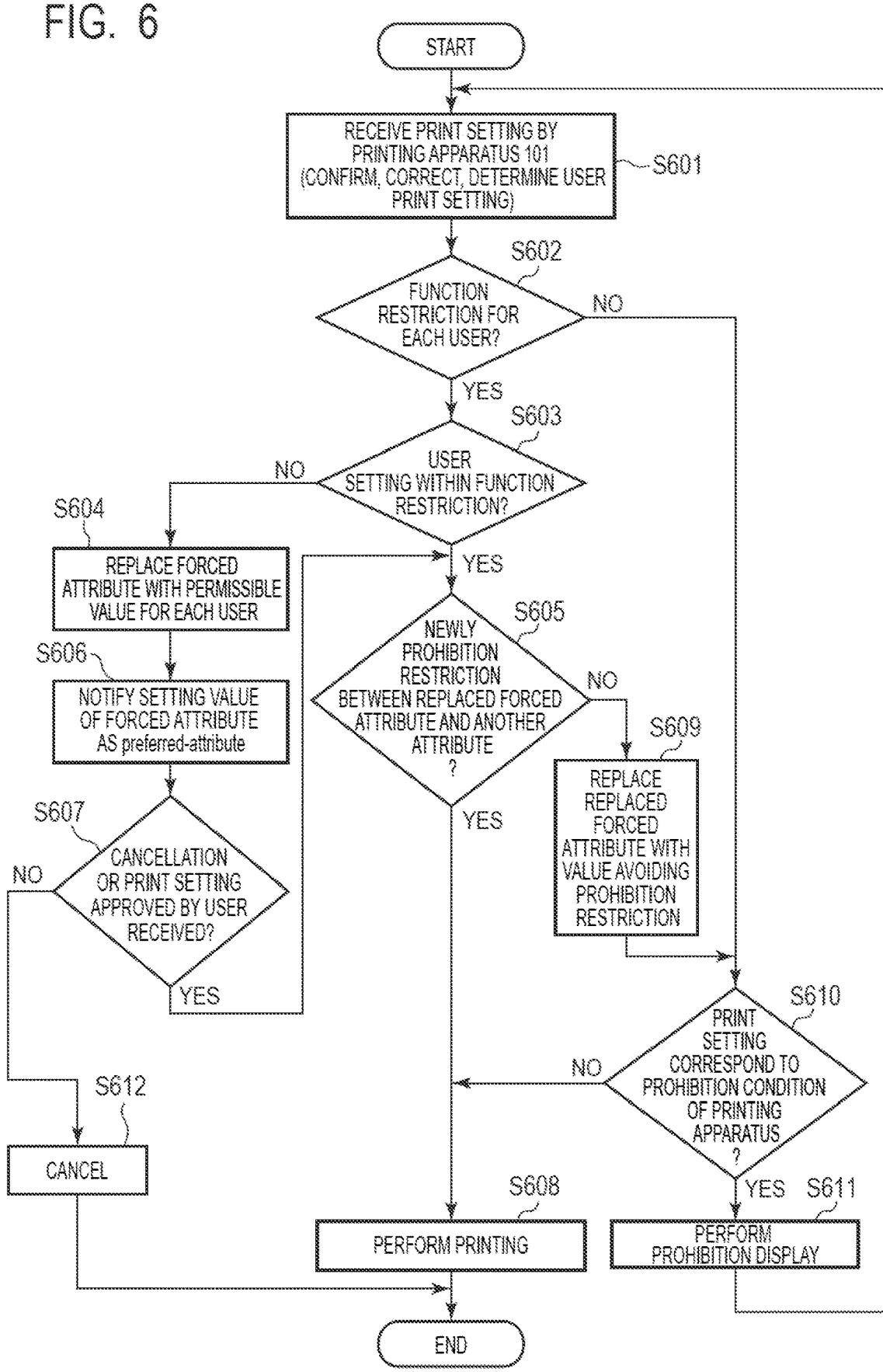
FIG. 6 is a diagram for describing an example of a flowchart of a process of the printing apparatus related to a print setting verifying process based on prohibition and a function restriction.

In FIG. 6, the print setting verifying process to be performed by the mobile job setting storage/verification part 303 and the print authority verification part 304 of the printing apparatus 101 in response to the print setting verification request (S4005) from the mobile terminal 103 will be described in detail with reference to the illustrated flowchart.

In the process in the former part of S601, the mobile terminal 103 accepts an input from the user. Then, the setting item on the print setting screen is confirmed, and the mobile terminal 103 accepts a press of the print button (9103 of FIG. 9). The mobile terminal 103 transmits the "Validate-Job-Request" to the printing apparatus 101 in response to the press of the print button (9103 of FIG. 9). The "Validate-Job-Request" includes the setting items set on the print setting screen. The printing apparatus 101 receives the print setting in S601. Incidentally, the print setting screen (9300 of FIG. 9) displayed on the mobile terminal 103 is generated based on a notification of the capability information (Get-Printer-Attribute-Response) from the printing apparatus 101.

As just described, in FIG. 6, the process is started in response to reception of the "Validate-Job-Request" by the printing apparatus 101. In S601, the printing apparatus 101 confirms the print setting items included in the "Validate-Job-Request". More specifically, the print setting items (9300 to 9500 of FIG. 9) are passed to the mobile job setting storage/verification part 303 of the printing apparatus 101 via the network in the form of the setting verification request (Validate-Job). The relevant print setting item is confirmed and discriminated.

Incidentally, the printing apparatus 101 grasps the user of the mobile terminal 103 that issues the verification request by performing the IPP authentication at the time of the setting verification request. Then, the printing apparatus inquires the print authority verification part 304 as to whether or not the print function restriction to be applied to the user is set (S602). When the printing apparatus 101 determines that there is no setting of the print function restriction for the user, the process proceeds to S610. On the other hand, when the printing apparatus 101 determines that there is the setting of the print function restriction, the process proceeds to S603.

In S603, the mobile job setting storage/verification part 303 determines, based on the information obtained from the print authority verification part 304, whether or not the print setting for which the verification is requested is within a function restriction range for the relevant user. When the mobile job setting storage/verification part 303 determines that the print setting is within the function restriction range, the process proceeds to S605. On the other hand, when it is determined that the print setting exceeds the function restriction range, the process proceeds to S604.

In S604, the setting value is forcedly changed such that the setting of the target item of the restriction function is within the function restriction range. More specifically, the two-sided printing is set for a user for which the one-sided printing is prohibited, the monochrome printing is set for a user for which the color printing is prohibited, and 2-in-1 printing is set for a user for which reduction printing of 2-in-1 or more is prohibited. Then, the process proceeds to S606.

In S606, the mobile job setting storage/verification part 303 notifies the following to the IPP client of the mobile terminal 103. That is, the print attribute (the value of the two-sided setting in the above example) replaced with the recommended value in S604 is notified as the recommended setting value via the IPP print service control part 315. Here, the recommended setting value is "preferred-attributes". In the message sample of FIG. 5, the recommended setting values for the error notification code of the message 5401, the prohibition target attribute of the message 5402, and the prohibition target attribute of the message 5403 are corresponding.

In S607, the printing apparatus 101 waits for reception of a cancellation notification from the mobile terminal 103 by the user or a print setting approved by the user. When the printing apparatus 101 receives the cancellation notification from the mobile terminal 103 in S607, a job cancelling process is performed in S612, and the process ends. Besides, when the print setting approved is received in S607, the process proceeds to S605.

Incidentally, in S605, as a result of replacement of the setting items in S604, it is verified whether or not the attribute for which the setting value is restricted for the user and the other attribute do not newly correspond to a prohibition specification of the printing apparatus. When a combination of the new setting values does not correspond to the prohibition specification, the process proceeds to S608. On the other hand, when the combination of the new setting values corresponds to the prohibition specification, the process proceeds to S609.

For example, in a case of a user who is required to perform the two-sided printing, the two-sided printing is temporarily enabled in S604, but a conflict may occur with other print setting items. Depending on a model, a paper size such as B5 or the like that cannot be subjected to the two-sided printing may be designated or a paper type that cannot be subjected to the two-sided printing may be designated due to convenience of the printing apparatus. When such a setting value is approved by the user and is received in S607, it is checked in S605 and NO is given. In such a case, the process proceeds to S609, and the mobile job setting storage/verification part 303 changes the setting item of the forced print setting to a value capable of avoiding the prohibition condition. For example, the two-sided printing is returned to the one-sided printing. Then, the process proceeds to S610.

Incidentally, in S606, the IPP client in the mobile terminal 103, that receives the notification including the recommended setting value (preferred-attributes) from the printing apparatus 101, performs the following process.

The recommended setting value (preferred-attributes) received from the printing apparatus 101 is re-displayed (9600) on the display of the mobile terminal 103 to the user in a form that the user can see the updated portion of the setting item (9500) on the print setting screen. Thus, the mobile terminal 103 requests the user to approve the changed portion. When approving the change, the user presses anew the print button (9103) on the print setting screen (proceeding to S605).

Alternatively, the recommended setting value (preferred-attributes) received from the printing apparatus 101 by the IPP client of the mobile terminal 103, that has received the notification of S606, may be automatically set to the print setting screen as a subsequent effective setting. After that, the previously set setting item may be cleared or invalidated, and may be re-displayed to the user in a form that the user can see the relevant portion. The display may be in a form that the user can see based on a user's icon operation.

In S610, the mobile job setting storage/verification part 303 of the printing apparatus 101 verifies whether or not the setting value of the IPP print job includes the prohibition restriction item of the printing apparatus 101. When the setting of the prohibition target based on the capability of the printing apparatus 101 is not included, the process proceeds to S608. On the other hand, when the setting of the prohibition target is included, the process proceeds to S611. Here, part of prohibition rules of the printing apparatus 101 is shown in FIG. 8.

In S608, the setting that has been verified by the mobile job setting storage/verification part 303 is stored in the job attribute storage part 308, and the printing apparatus 101 performs the PDL analyzing process/RIP process and the RIP image printing process described above according to the stored setting.

In S611, the mobile job setting storage/verification part 303 notifies, as the verification result, the mobile terminal 103 of the verification error based on the prohibition condition (5301) and the setting value of the attribute corresponding to the prohibition condition (5302), via the IPP print service control part 315.

Upon receipt of the relevant notification, the IPP client on the side of the mobile terminal 103 notifies the user that the attribute notified in (5302) corresponds to the prohibition condition and that the setting value needs to be reviewed (9403). The user changes the print setting according to the instruction, and presses the print button (9103) again. Then, the process returns to S611 again.

Incidentally, in S611, a recommended setting that is not prohibited may be sought, and a screen in which the recommended setting sought is automatically set as a subsequent setting may be displayed to the user. Alternatively, a recommended setting that is not prohibited may be presented to the user as a post-setting, and the setting may be performed on condition of a user's approval. The process may be ended if the post-setting approval by the user is denied. However, this process is not essential.

Hereinafter, FIG. 7 will be described. Namely, FIG. 7 is the diagram for describing an example of a management table and concrete data held by the management server 105 of user authority in the present embodiment. Here, the row of the table indicates the setting for each user, and the column thereof indicates the function of the printing apparatus that can be used for each user.

In S603, the printing apparatus 101 identifies the user of the print job, and notifies the management server 105 of the identified user. The management server 105 receives an inquiry about the forced setting item of each user from the printing apparatus 101 in S4006. The management server searches for the corresponding user and notifies the printing apparatus 101 of ON/OFF of the forced setting item (S4007). In the present embodiment, the print function capable of being used by four persons, i.e., Mr. Sato, Mr. Suzuki, a guest user and an administrator is registered. In the printing apparatus 101 corresponding to the management server 105 of user authority, a specific user is required to use the functions of the two-sided printing, the monochrome printing and the Nup printing. For example, Mr. Sato and the guest user are required to use the functions of the two-sided printing, the monochrome printing and the 2-in-1 printing, and cannot use one-sided output, color printing and 1-in-1 print setting (if they are set, printing cannot be started). Mr. Suzuki can use the color printing because the forced monochrome printing is F (false), but cannot use the one-sided printing and the 1-in-1 printing. Only the administrator can use the two-sided printing, the color printing and the 1-in-1 printing. Upon receiving the information of FIG. 7 from a management saver, the printing apparatus 101 may determine whether or not the set content corresponds to the prohibition condition related to the authority of the user.

If the one-sided printing is set for the job of Mr. Sato, the setting of the one-sided printing will be replaced with the setting of the two-sided printing (S604).

Hereinafter, FIG. 8 will be described.

In the present embodiment, the printing apparatus 101 provides "two-sided printing", "monochrome printing" and "2-in-1 printing" as the printing functions to be forcedly applied. In Tables 8100 and 8200, combinations of the attributes for which the two-sided printing cannot be forcedly applied (8110/8210), combinations of the attributes for which the two-sided printing can be forcedly applied (8120/8220), and respective alternative settings thereof are shown. Besides, alternative settings (8121/8221) in a case where the forced attribute is applicable are treated as the recommended settings (preferred-attributes).

FIG. 8 is referred to in S606. For example, if the one-sided printing is set in the job of Mr. Sato, the setting of the one-sided printing will be replaced with the setting of the two-sided printing (S604).

Then, in S606, presence/absence of the prohibition between the setting of the two-sided printing and the other setting values of the job of Mr. Sato is determined from FIG. 8. If the OHP sheet is set for the job of Mr. Sato, two-sided OFF is determined as the alternative setting value. Alternatively, there is also a way of thinking that the OHP sheet is set to OFF as the alternative setting by prioritizing the setting of the two-sided printing instructed to be set by the system later.

In Table 8300, a combination of the attributes for which the monochrome printing cannot be forcedly applied is shown (there is no particular restriction because there is no corresponding column). In this case, since the forced attribute can always be provided, the alternative setting (8311) to which BW designation can be applied is treated as the recommended setting (preferred-attributes).

In Table 8400, combinations of the attributes for which the 2-in-1 printing cannot be forcedly applied are shown. More specifically, a combination of the attributes for which 2up printing cannot be forcedly applied (8410) and respective alternative settings thereof (8420) are shown, and a combination of the attributes for which the relevant printing can be forcedly applied (8420) and respective alternative settings thereof (8421) are shown. The alternative setting (8421) in a case where the 2up printing can be forcedly applied is treated as the recommended setting (preferred-attributes).

FIG. 9 is the diagram for describing an example of the print setting screen (print screen) of the IPP client in the present embodiment. More specifically, FIG. 9 shows a basic print screen 9100, and a printer selection screen 9200 on the same network.

The user calls the print screen (9100) from the application, presses a printer selection button of 9101, opens the screen 9200, and selects a printer from 9201. At this time, the printer capability information is obtained, and printer option information is obtained. Thus, the option setting 9300 of the selected printer can be displayed. In the option setting 9300 of FIG. 9, a sheet size (9301), a paper type (9302), a color mode (9303), two-sided printing (9304), and Nup (9305) are examples of the items capable of being set.

Besides, 9400 of FIG. 9 is an example of a user notification screen in a case where the setting items set by the user correspond to prohibition setting. For example, it is assumed that "OHP" is designated in the paper type 9302 and "two-sided printing" is designated in the setting of the two-sided printing 9304. Here, when the user presses the print button (9103) after a series of the settings, printing apparatus side setting verification (Validate-Job process) is performed. As a result, it is displayed on the display of the mobile terminal 103 as icons of 9401 and 9402 and a message of 9403 that the paper type and the setting of the two-sided printing are prohibition attributes.

Next, a case will be described in which the print setting of the user does not correspond to the prohibition condition as the normal printing apparatus setting but is not within a range that is permitted to use for each user. In the setting item 9500 of FIG. 9, "user: Mr. Sato" performs the print setting of A4, plain paper and one-sided printing (9501). However, according to the authority table of FIG. 7, the two-sided printing is obligatory (required) for "user: Mr. Sato". For this reason, the setting is verified (Validate-Job process) when the print button 9103 is pressed, and, as a result, the printing apparatus 101 notifies the portable terminal 103 that the two-sided printing should be changed to ON as the recommended setting. This process corresponds to S601 to S606 of FIG. 6. In response to this, the IPP client of the mobile terminal 103 displays a warning on the screen of 9601, changes the previous setting of the two-sided printing of 9602 from OFF to ON, and displays a guide message on 9603. Alternatively, before changing the previous setting of the two-sided printing of 9602 from OFF to ON, a message asking whether or not to change the setting of the two-sided printing of 9602 from OFF to ON may be displayed. After then, the process proceeds to S607.

As described above, according to the present embodiment, in the case where the print setting corresponds to the prohibition condition based on the specifications of the printing apparatus, only the attribute corresponding to the prohibition condition and the value thereof are displayed, but a recommended alternative setting value in which the specific attribute value is changed is not displayed. On the other hand, in the case where the print setting includes the restricted function and/or setting value set for each user, the setting value of the setting item that conflicts with the restriction and the recommended value as an alternative setting are shown. Thus, only in the case where the implementation load of the printing apparatus can be suppressed, where the user needs the reason why the print setting is prohibited and the recommended alternative setting, and where the printing apparatus can reliably propose the recommended setting value that the user needs, it is possible to provide the recommended setting value.

In IPP printing, a means called "Validate-Job" is provided in which only the print setting is confirmed in advance from a host terminal before transfer of the print job. As a result of the verification, when the setting corresponds to "prohibition condition" or "function restriction for each user", the printing apparatus 101 only has to notify the following.

(1) In case of "nonprintable" as a result of the verification, the following is notified as reasons.
(2) Which setting value is the cause.
(3) How to change the setting.

For example, in a case where the two-sided printing is set for an OHP paper, the following is notified.

Size: A4
Paper type: OHP
Two-sided printing: ON

As a method of solving the prohibition condition, the paper size may be changed to a paper that allows the two-sided printing, or the two-sided printing may be disabled and printing may be performed as the one-sided printing. Although it is easy to detect that the setting corresponds to the prohibition condition, there are a plurality of alternative solutions for avoiding the prohibition, and thus the appropriate recommended setting differs for each user. In this example, some users may prefer an alternative setting to change the OHP paper to a plain paper and continue the two-sided printing. Other users may prefer an alternative setting to maintain the OHP paper and change the two-sided printing to the one-sided printing. Besides, if printing cannot be performed with a desired setting, the user may request cancellation of the printing. In this way, the correct answer for the recommended setting and/or the alternative setting cannot be uniquely defined. In such a case, it is also one proposal to dare to only present the prohibition condition.

On the other hand, "function restriction for each user" can be selected on the print screen of the IPP client and can be designated as the capability of the printing apparatus 101. However, it is expected that it becomes a setting verification error at the time of printing (at the time of verifying the print setting). This makes it difficult for the user to know the cause of the error. Therefore, with respect to the error associated with "function restriction for each user", it is desirable that the printing apparatus 101 indicates the cause of the error and its alternative setting to the user in the notification of the result of the preliminary verification (Validate-Job) of the print setting.

In the present embodiment, in the case where the setting corresponds to the "prohibition condition" of the printing apparatus main body and the printing cannot be performed, it is difficult to uniquely determine the correct answer. Therefore, only the "prohibition condition" is presented and the "proposed alternative setting" is not performed. However, in the case where the printing cannot be performed due to "function restriction for each user", the printing can surely be performed by changing the setting value of the restricted function to the recommended value from the printing apparatus (i.e., the setting value permitted for the user). Therefore, the setting of the "function restriction" target and the appropriate setting value are fed back to the user. By narrowing the proposed range of the recommended setting to "function restriction for each user", it is possible to improve the accuracy of "proposal of alternative setting value" for the user and also reduce the implementation load of the proposal of the recommended setting of the printing apparatus 101.

According to the present embodiment, even in the case where the printing is performed from the mobile terminal or the like via the general-purpose printing service such as the IPP or the like, the printing apparatus 101 can suppress complexity of the product implementation for the user of the host terminal. Moreover, the error display for the normal prohibition condition, the error display for the function restriction for each user, and the recommended setting can be notified.

As just described, the following has been disclosed in the present embodiment. The printing apparatus 101 has the communication unit I/F 223 that receives the setting value of the print job from the mobile terminal 103. Besides, in the case where the print setting received by the communication unit I/F 223 corresponds to the prohibition condition and does not correspond to the prohibition condition based on the print authority of the job issuing source, the communication unit I/F 223 performs the following. That is, the communication unit I/F 223 notifies the mobile terminal 103 of the combination of the setting values of the prohibition target, and does not notify of the alternative setting not corresponding to the prohibition condition. The printing apparatus 101 has the communication unit I/F 223 like this.

Further, the printing apparatus 101 may have the communication unit I/F 223 that receives the job setting value from the communication apparatus. Furthermore, when the setting value received by the communication unit I/F 223 includes the setting value corresponding to the prohibition of the print authority of the job issuing source, the following may be performed. When the alternative setting value capable of being the alternative of the setting value corresponding to the prohibition of the printing authority of the job issuing source corresponds to the predetermined prohibition condition related to the setting value of the job, the communication unit I/F 223 does not notify the setting capable of being the further alternative of the alternative setting value. Besides, the communication unit I/F 223 notifies the information related to the predetermined prohibition condition. The recommended setting value described so far is the example of the alternative setting value.

When the setting value of the print job corresponds to the prohibition condition based on the print authority of the job issuing source, the communication unit I/F 223 notifies as the prohibition target the setting value corresponding to the prohibition of the authority. Moreover, the communication unit I/F 223 may notify a setting value not corresponding to the prohibition of the authority as the alternative setting value.

The prohibition condition based on the print authority of the job issuing source may include the setting condition related to at least one of the setting related to the two-sided printing, the setting related to the color printing, and the attribute related to the Nup printing. Besides, all of these three settings may be included in the setting condition, two of these settings may be included in the setting condition, or one of these settings may be included in the setting condition.

According to one aspect of the present invention, it is possible to suppress the complexity in implementing the service using the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a controller configured to:
 transmit capability information to an information processing apparatus;
 notify the information processing apparatus of information in a case that first print setting values received from the information processing apparatus include a predetermined print setting value, wherein the first print setting values are set via a print setting screen displayed by the information processing apparatus based on the transmitted capability information; and
 process print data received from the information processing apparatus based on second print setting values that are changed from the first print setting values, wherein the second print setting values are received from the information processing apparatus.

2. The image forming apparatus according to claim 1, wherein the information is transmitted to the information processing apparatus in a case it is determined the first print setting values include the predetermined print setting value, and the determination is executed by the controller.

3. The image forming apparatus according to claim 1, wherein the predetermined print setting value is a print setting value set as a prohibition condition.

4. The image forming apparatus according to claim 1, wherein the controller is further configured to transmit an alternative print setting value of the predetermined print setting value in a case that the first print setting values received from the information processing apparatus include the predetermined print setting value.

5. The image forming apparatus according to claim 4, wherein the alternative print setting value is used for displaying by the information processing apparatus.

6. The image forming apparatus according to claim 1, wherein the controller notifies the information processing apparatus in a case that the first print setting values include print setting values that conflict with each other.

7. The image forming apparatus according to claim 1, wherein the predetermined print setting value is specified based on a user identifier received from the information processing apparatus.

8. A control method for controlling an image forming apparatus, the method comprising:

transmitting capability information to an information processing apparatus;

notifying the information processing apparatus of information in a case that first print setting values received from the information processing apparatus include a predetermined print setting value, wherein the first print setting values are set via a print setting screen displayed by the information processing apparatus based on the transmitted capability information; and processing print data received from the information processing apparatus based on second print setting values that are changed from the first print setting values, wherein the second print setting values are received from the information processing apparatus.

9. The control method according to claim 8, wherein the information is transmitted to the information processing apparatus in a case it is determined the first print setting values include the predetermined print setting value, and the determination is executed by the controller.

10. The control method according to claim 8, wherein the predetermined print setting value is a print setting value set as a prohibition condition.

11. The control method according to claim 8, wherein the method further comprises transmitting an alternative print setting value of the predetermined print setting value in a case that the first print setting values received from the information processing apparatus include the predetermined print setting value.

12. The control method according to claim 11, wherein the alternative print setting value is used for displaying by the information processing apparatus.

13. The control method according to claim 8, wherein the control method further comprises notifying the information processing apparatus in a case that the first print setting values include print setting values that conflict with each other.

14. The control method according to claim 8, wherein the predetermined print setting value is specified based on a user identifier received from the information processing apparatus.

15. A non-transitory computer-readable medium having storing computer-executable instructions that, when executed by a computer, cause the computer to perform a control method for an information processing apparatus, the control method comprising:

transmitting capability information to an information processing apparatus;

notifying the information processing apparatus of information in a case that first print setting values received from the information processing apparatus include a predetermined print setting value, wherein the first print setting values are set via a print setting screen displayed by the information processing apparatus based on the transmitted capability information; and processing print data received from the information processing apparatus based on second print setting values that are changed from the first print setting values, wherein the second print setting values are received from the information processing apparatus.

* * * * *